April 27, 1965  J. SCHIFFMAN ETAL  3,181,148
SELECTIVE RANGE DETECTING SYSTEM
Filed March 30, 1959
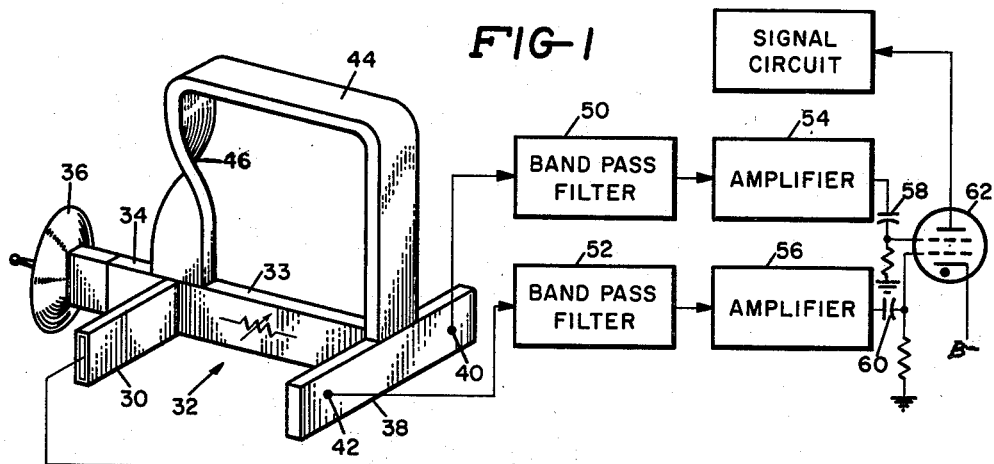
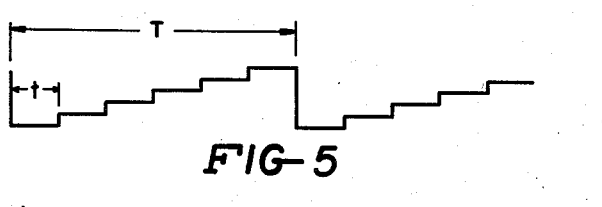
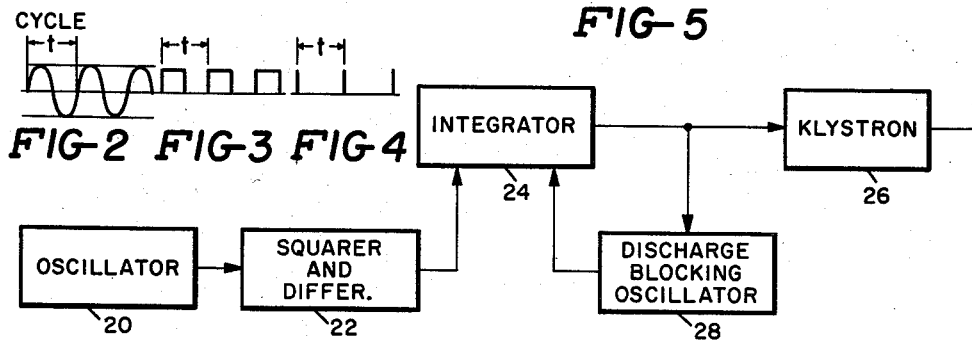
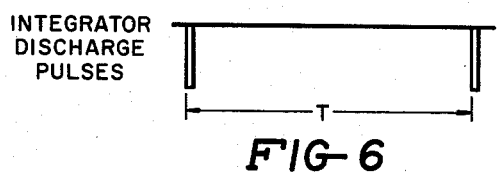
INVENTOR.
JULIUS SCHIFFMAN
BY  ZDZISLAW I. SZEWCZYK
ATTORNEY United States Patent Office 3,181,148
Patented Apr. 27, 1965

3,181,148
SELECTIVE RANGE DETECTING SYSTEM
Julius Schiffman, Huntington Woods, and Zdzislaw I. Szewczyk, Hamtramck, Mich., assignors to The Bendix Corporation, a corporation of Delaware
Filed Mar. 30, 1959, Ser. No. 802,673
9 Claims. (Cl. 343—8)

This invention pertains to a selective range detecting system and more particularly to a detecting system, such as a radar system, wherein the detection is limited to a specific distance range.

It is an essential object of this invention to provide a detection system wherein a beam of high frequency radiant energy is emitted and reflected upon detection, with means for periodically changing the frequency of emission and with means for selecting frequencies of returned signals so that only reflected signals having travel times in a predetermined range are utilized.

It is another object of this invention to provide a detection system wherein a beam or signal of high frequency radiant energy is emitted and then reflected upon detection, with means for periodically changing the frequency of emission with a period of each frequency being of a predetermined length, and the means for comparing the received or reflected frequencies with the emitted frequency so that only those return or reflected signals which correspond to a desired distance range are selected.

It is another object of this invention to provide in such a system means for comparing the reflected and emitted frequencies by adding or mixing the frequencies to obtain a resultant frequency which, if not in the selected range, will be outside the pass band of the receiver thereby limiting detection to a particular predetermined range.

It is a further object to utilize such a system as a closure signal device between two objects, such as two motor vehicles, wherein the frequency of an emitted signal is changed by the closure rate between the two objects due to the Doppler principle and to provide means to measure this difference in frequency to determine the rate of closure.

It is a further object to provide a closure signal system wherein a beam of high frequency radiant energy is emitted and reflected upon detection with means for periodically changing the frequency of emission and with means for mixing the reflected signal with the emitted signal to determine any difference in frequency due to the closure rate between the frequency source and another object, with a period of each emission frequency being of such a duration so as to correspond with a distance range, with reflected signals having an emission frequency different than the emission frequency during their reception being rejected by filter means to limit the detection system to a particular range.

It is another object of this invention to provide a detection system wherein a beam of high frequency radiant energy, such as a radio beam, is emitted and reflected upon detection with means for periodically changing the level of emission frequency so as to form a stepped emission frequency, with means for mixing the reflected frequency with the emission frequency to obtain a resultant frequency and with means for selecting a particular resultant frequency or range of resultant frequencies which correspond to particular travel times of the reflected signal.

It is another object to provide a detection system wherein a beam of high frequency radiant energy is emitted and reflected upon detection with means for stepping the emission frequency and with means for comparing the reflected frequencies with the emission frequency and selecting only those reflected frequencies having emission frequencies which are in a predetermined ratio to the current emitted frequency.

These and other objects will become more apparent when a particular embodiment of our invention is considered in connection with the drawings, in which:

FIGURE 1 is a block-schematic diagram of a preferred embodiment of our invention wherein closure rates between two objects, such as motor vehicles, are detected and with the range of such detection being limited;

FIGURE 2 is a wave form diagram corresponding to the oscillator section of the range limiting portion;

FIGURE 3 is a wave form diagram of the squaring section of the range limiting portion;

FIGURE 4 is a wave form diagram of the differentiating section of the range limiting portion;

FIGURE 5 is a wave form diagram of the integrating section of the range limiting portion; and FIGURE 6 is a wave form of the discharge blocking oscillator of the range limiting portion.

In closure warning systems, such as those employed between automobiles on the highway which provide a warning or braking action to the vehicle when a closure rate exceeds a safe rate, a problem has existed which caused an excessive number of "false alarms" energizing the warning or braking mechanism at improper times. These systems in general utilize a radar beam which is emitted from and directed forwardly of a first vehicle and is designed to impinge upon and be reflected by a second vehicle with the reflected beam being of a different frequency than the emitted beam corresponding to the closure rate due to the well known Doppler principle. A serious drawback to such a system is that when the first vehicle is turning a corner, driving under a bridge or overpass, or driving over hilly roads, the warning or braking system would be energized due to the radar beam striking distant buildings, bridge members, or other natural or manufactured structures.

This invention overcomes this problem by limiting the range of the effective radar signal so that reflected signals from distant objects, such as buildings or other structures, which due to a curved or hilly road condition tend to actuate the warning system, are discarded. This is accomplished by stepping the emission frequency, comparing the reflected signal to the emission frequency at the time of its reception at the source and then passing only those reflected signals which had the same emission frequency. The time of each step is of such a duration that the reflected signal has only a limited time in which to reach an object and return so that distant objects will not actuate the warning system. If a reflected signal having a given emission frequency is received at a time during a second emission frequency, its addition to the second emission frequency will obtain a resultant frequency which is outside the receiver pass band. A preferred embodiment of our invention shown in the drawings will now be discussed.

In FIGURE 1 is shown an oscillator 20 which provides a sinusoidal wave having a cycle time $t$ as shown in FIGURE 2. The sinusoidal wave is supplied to the squarer and differentiator 22 which first squares the wave as shown in FIGURE 3 and then provides wave peaks or pulses as shown in FIGURE 4. The pulses of the wave in FIGURE 4 are then inserted in an integrator 24 which provides a stepped voltage as shown in FIGURE 5. This step voltage is supplied to the repeller of a reflex klystron tube 26 and to a discharge blocking oscillator 28 which, after the voltage amplitude in the wave form of FIGURE 5 reaches a predetermined level, will fire to discharge the integrator 24 and bring the voltage to a lower initial value. The wave form from oscillator 28 is shown in FIGURE 6 and occurs every period of time T so that the voltage going to the repeller of the klystron 26 takes the form of a succession of stepped voltages with the number of steps in each period being determined by the time T.

The klystron changes the stepped voltages to corresponding stepped frequencies with the difference between each step being of a predetermined value. Embodiments having a difference in frequency between steps of one to 5 megacycles have been found to be very satisfactory in operation. The output of the klystron 26 is connected to input branch 30 of a waveguide directional coupler or magic tee assembly 32. The signal from branch 30 is split at its juncture with the main arm 34, with a portion of the input going leftwardly to a sending and receiving antenna 36 and with a smaller portion going rightwardly to an attenuated portion 33 of branch 34 which terminates in a connection with a cross member 38 wherein the signal is split equally between the arms of member 38 and with the signal in one arm being 180° out of phase with the signal in the other arm. Near the end of the arms are placed crystals 40 and 42.

Connected to main arm 34 and to arm 38 is a U-shaped element 44 which also receives a portion of the input signal from branch 30 and has a 90° turn therein at 46 so that one end is aligned longitudinally with arm 34 and the other end is aligned longitudinally with transverse or cross member 38. The length of element 44 different than the length of arm 34 between branch 30 and cross member 38 by an odd multiple of one-quarter wave lengths of the emission frequency from klystron 26 so that the portion of the signal from klystron 26 is shifted 90° in phase relative to the signals from arm 34 and combines with the signals in member 38 to form two resultant signals which are 90° out of phase. Also, the reflected signal enters assembly 32 and is mixed with the resultant signal at crystals 40, 42 to form difference frequency signals 90° out of phase. For opening movements between vehicles, one difference frequency signal will lead the other and for closing movement, it will lag the other. (A more detailed explanation of the operation and purpose of the magic tee assembly 32 can be found in a co-pending application of J. Schiffman entitled "Closure Signal System," filed previously.)

The difference frequency signals are the result of (1) a Doppler change in frequency due to opening or closure rates between vehicles and (2) any difference between the emission frequency of the reflected signal, and the emission frequency at the time the reflected signal is received.

Crystals 40 and 42 are connected respectively to pass band filters 50 and 52 which in turn are connected to amplifiers 54 and 56, respectively. The function of filters 50 and 52 is to prevent passage of difference frequency signals having a frequency greater than the normal range of frequencies due to the closure between the two vehicles so that a reflected signal having an emission frequency different from the emission frequency at the time it is received will not pass to the amplifier section. Referring to FIGURE 6, if a signal emitted during cycle t is received at any time later than cycle t in period T, it will be discarded since it will be mixed with a different emission frequency and will not pass the filter. This in effect prevents signals from distant objects from creating false alarms in a closure system since a reflected signal, in order to be effective, must be received by the antenna before its emission frequency has been changed.

The amplifiers 54 and 56 are connected through capacitors 58 and 60, respectively, to the grids of thyratron 62 which is in a warning or braking circuit so that when it fires it will energize the circuit. The values of the capacitors 58 and 60 are chosen so that one has a much higher capacitance than the other with the smaller capacitor acting as a differentiator to introduce a further 90° phase shift between the voltage signals. In this manner a plus 90° phase shift between the two signals from crystals 40 and 42 will result in an in phase signal on the grids of the thyratron 62 causing the tube to fire and a −90° phase shift will result in 180° out of phase on the grids of thyratron 62 and the tube will not fire so that only closing signals actuate the thyratron and signal circuit. (This is also explained in more detail in the above mentioned Schiffman application.)

Briefly, the operation of this system is as follows. The oscillator 20 supplies a signal to the squarer and differentiator 22 which inserts into integrator 24 a series of voltage pulses which are formed into successive sequences of stepped voltage wave forms. These wave forms are forwarded to the repeller of the klystron 26 and to a discharge blocking oscillator 28 which, after a certain level of voltage has been reached in the integrator, will fire, discharging the integrator to an initial voltage value whereupon the stepping will begin again in a new sequence. Klystron 26 feeds its output to branch 30 of magic tee assembly with a portion of the output going through arm 34 and member 38 to crystals 40 and 42, a portion going to antenna 36 which beams a radar signal in a forward direction and a portion going to element 44. When the signal from antenna 36 is reflected from another vehicle, the reflection is received by the antenna and passes into the end of arm 34 and then upwardly into element 44 where it combines with the input signal which, due to the length of element 44, is shifted 90° in phase with respect to the signal coming from klystron 26. The reflected and emitted signals are then mixed in crystals 40 and 42 to provide the resultant frequency which will correspond to the difference in the emitted and reflected frequencies corresponding to the closure rate between the two vehicles and to any difference between the emission frequency of the reflected signal and the emission frequency from klystron 26 during the time the reflected signal is received.

If there is a difference between these two emission frequencies, this indicates that the reflected signal has been out too long and, therefore, is bringing in unneeded information. The low frequency filter sections 50 and 52 are designed to pass only resultant frequencies from crystals 40 and 42 that are relatively low and would correspond to closure frequency differences due to the Doppler principle and will block higher frequencies due to any difference in emission frequency. In this manner the effective distance of the radar system is limited.

The signals from the filter sections are then amplified and inserted into capacitive circuits 58 and 60 where an additional phase shift is introduced in one of the signals so that for closing movements, the signals to the grids of thyratron 62 will be in phase to fire the warning circuit and for opening movements, the wave forms to the grids of thyratron 62 will be 180° out of phase cancelling one another so that the tube is not fired.

While the range limiting means shown in this application has been applied to an automotive closure warning system and has put an upper limit on the distance to which the detection system is sensitive, it will be appreciated by those familiar with the art that this system can also be applied in different manners and in different systems and can be employed to put a lower limit on the range or by selective filtering be sensitive to an intermediate range and reject distances above and below this range.

Having thus described our invention, we claim:

1. A selective range reflection system for use in a motor vehicle wherein an emitted signal is reflected to the source from an object in its path for sensing the closure rates between a first and second object by means of a Doppler difference between the emitted and reflected signal, comprising means for transmitting a radar signal from one of said objects to the other, means for stepping the transmission frequency of the signal from one level to another, means for receiving the reflected signal and mixing the reflected signal with the transmitted signal to provide a mixed signal, said mixed signal being proportional to the Doppler difference in frequency between the transmitted and reflected signal and being proportional to any difference in frequency level of the stepped transmission frequency and time of sending and at the time of receiving the reflected signal, means responsive to closing Doppler signals, means to pass only the mixed signals wherein the transmission frequency of the reflected signal is in a predetermined ratio to the transmission frequency during reception of the reflected signal to energize said means responsive to closing Doppler signals.

2. A selective range reflection system for use in a motor vehicle wherein an emitted signal is reflected to the source from an object in its path for sensing the closure rates between a first and second object by means of a Doppler difference between the emitted and reflected signal, comprising means for transmitting a radar signal from one of said objects to the other, means for stepping the transmission frequency of the signal from one level to another, means for receiving the reflected signal and mixing the reflected signal with the transmitted signal to provide a mixed signal, said mixed signal being proportional to the Doppler difference in frequency between the transmitted and reflected signal and being proportional to any difference in frequency level of the stepped transmission frequency and time of sending and at the time of receiving the reflected signal, means responsive to closing Doppler signals, a band pass filter means for passing only the mixed signals wherein the transmission frequency of the reflected signal is the same as the transmission frequency during reception of the reflected signal to energize said means responsive to closing Doppler signals.

3. A selective range reflection system for use in a motor vehicle wherein an emitted signal is reflected to the source from an object in its path for sensing the closure rates between a first and second object by means of a Doppler difference between the emitted and reflected signal comprising means for transmitting a radar signal from one of said objects to the other, means for stepping the transmission frequency of the signal from one level to another, means for receiving the reflected signal and mixing the reflected signal with the transmitted signal to provide a mixed signal, said mixed signal being proportional to the Doppler difference in frequency between the transmitted and reflected signal and being proportional to any difference in frequency level of the stepped transmission frequency and time of sending and at the time of receiving the reflected signal, closure indicating means, means to block those mixed signals which have a frequency above a predetermined level and pass the remaining signals to said energized closure actuated means, whereby the range of the detector system is preselected.

4. A radar system comprising means for transmitting a radar signal, means for stepping the transmission frequency from one level to another, means for receiving the reflected signal and mixing the reflected signal with the transmitted signal to provide a mixed signal, band pass means for passing frequencies of the mixed signals in a predetermined range.

5. A radar system comprising means for transmitting a radar signal, means for stepping the transmission frequency from one level to another comprising an oscillator, a squarer and differentiator connected to said oscillator for generating a series of spaced voltage pulses, an integrator for receiving said voltage pulses and successively increasing the output voltage, a klystron for receiving said successively increased output and emitting a successively increased output frequency, means for receiving the reflected signal and mixing the reflected signal with the transmitted signal to provide a mixed signal, band pass means for passing frequencies of the mixed signals in a predetermined range.

6. A radar system comprising means for transmitting a radar signal, means for stepping the transmission frequency from one level to another comprising an oscillator, a squarer and differentiator connected to said oscillator for generating a series of spaced voltage pulses, an integrator for receiving said voltage pulses and successively increasing the output voltage, a klystron for receiving said successively increased output and emitting a successively increased output frequency, means for receiving the reflected signal and mixing the reflected signal with the transmitted signal to provide a mixed signal, band pass means for passing frequencies of the mixed signals in a predetermined range, a discharge blocking oscillator for receiving said successively increasing voltage pulses and at a predetermined voltage level, discharging said integrator to its initial voltage value.

7. A radar system for use in a motor vehicle closure warning system comprising means for transmitting a radar signal, means for stepping the transmission frequency from one level to another comprising an oscillator, a squarer and differentiator connected to said oscillator for generating a series of spaced voltage pulses, an integrator for receiving said voltage pulses and successively increasing the output voltage, a klystron for receiving said successively increased output and emitting a successively increased output frequency, means for receiving and dividing the reflected signal into out of phase components, means for mixing the reflected signal components with the transmitted signal to provide mixed signals, band pass means for passing frequencies of the mixed signals in a predetermined range, means for differentiating one of said mixed signals so that for a closing movement of the vehicle on an object the mixed signals will be in phase and for an opening movement they will be out of phase.

8. A radar system for use in a motor vehicle closure warning system comprising means for transmitting a radar signal, means for stepping the transmission frequency from one level to another comprising an oscillator, a squarer and differentiator connected to said oscillator for generating a series of spaced voltage pulses, an integrator for receiving said voltage pulses and successively increasing the output voltage, a klystron for receiving said successively increased output and emitting a successively increased output frequency, means for receiving and dividing the reflected signal into out of phase components, means for mixing the reflected signal components with the transmitted signal to provide mixed signals, ban pass means for passing frequencies of the mixed signals in a predetermined range, means for differentiating one of said mixed signals so that for a closing movement of the vehicle on an object the mixed signals will be in phase and for an opening movement they will be out of phase, a discharge blocking oscillator for receiving said successively increasing voltage pulses and at a predetermined voltage level, discharging said integrator to its initial voltage value.

9. A selective range reflection system for use in a motor vehicle wherein an emitted signal is reflected to the source upon detection for sensing the closure rates between a first and second object by means of a Doppler difference between the emitted and reflected signal comprising means for transmitting a radar signal from one of said objects to the other, means for stepping the transmission frequency of the signal from one level to another, means for receiving and dividing the reflected signal into out of phase components, means for mixing the reflected signal components with the transmitted signal to provide mixed signals, said mixed signals being proportional to the Doppler difference in frequency between the transmitted and reflected signal and being proportional to any difference in frequency level of the stepped transmission frequency and time of sending and at the time of receiving the reflected signal, means to block those mixed signals which have a frequency above a predetermined level and pass the remaining signals to said energized closure actuated means, whereby the range of the detector system is preselected, means for differentiating one of said mixed signals so that for a closing movement of the vehicle on an object the mixed signals will be in phase and for an opening movement they will be out of phase.

References Cited by the Examiner
UNITED STATES PATENTS

| | | | |
|---|---|---|---|
| 2,522,367 | 9/50 | Guanella | 343—14 |
| 2,553,907 | 5/51 | Fleming-Williams | 343—14 |
| 2,817,832 | 12/57 | Mathes | 343—13 |
| 2,923,004 | 1/60 | Warnecke | 343—14 |
| 3,076,191 | 1/63 | Williams | 343—7 |

CHESTER L. JUSTUS, *Primary Examiner.*

KATHLEEN CLAFFY, FREDERICK M. STRADER,
*Examiners.*